United States Patent
Kim et al.

(10) Patent No.: US 11,563,501 B2
(45) Date of Patent: Jan. 24, 2023

(54) ELECTRONIC DEVICE COMPENSATIVELY ADJUSTING VALUE ACQUIRED BY ANTENNA, AND OPERATING METHOD THEREFOR

(71) Applicant: Samsung Electronics Co., Ltd., Suwon-si (KR)

(72) Inventors: Hyunsoo Kim, Suwon-si (KR); Myungjin Kang, Suwon-si (KR); Hyungjoon Yu, Suwon-si (KR); Jongho Park, Suwon-si (KR); Seonghyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/297,948

(22) PCT Filed: Nov. 5, 2019

(86) PCT No.: PCT/KR2019/014895
§ 371 (c)(1),
(2) Date: May 27, 2021

(87) PCT Pub. No.: WO2020/111554
PCT Pub. Date: Jun. 4, 2020

(65) Prior Publication Data
US 2022/0085897 A1    Mar. 17, 2022

(30) Foreign Application Priority Data
Nov. 27, 2018  (KR) .......................... 10-2018-0148461

(51) Int. Cl.
*H04B 17/21*        (2015.01)
*H04B 17/318*      (2015.01)

(52) U.S. Cl.
CPC ........... *H04B 17/21* (2015.01); *H04B 17/318* (2015.01)

(58) Field of Classification Search
CPC ........ H04B 17/10; H04B 17/12; H04B 17/21; H04B 17/318
See application file for complete search history.

(56) References Cited

U.S. PATENT DOCUMENTS 7,522,883 B2    4/2009   Gebara et al.
8,913,040 B2 *  12/2014  White ................. G06F 3/04184
                                              345/174

(Continued)

FOREIGN PATENT DOCUMENTS

JP    2004-179861 A    6/2004
JP    2016-103812 A    6/2016

(Continued)

OTHER PUBLICATIONS

International Search Report dated Feb. 19, 2020 in connection with International Patent Application No. PCT/KR2019/014895, 2 pages.

(Continued)

*Primary Examiner* — Thanh C Le

(57) ABSTRACT

According to various embodiments, an electronic device may comprise: a communication circuit which comprises a first antenna component and a second antenna component to determine a first value through the first antenna component and determine a second value through the second antenna component; a processor; and at least one memory, wherein the at least one memory has instructions stored therein which cause, when executed, the processor to: determine whether a first module disposed in the vicinity of the first antenna component has started operating; compensatively adjust a first value obtained during the operation of the first module, by using a first value obtained before the operation of the first module or a second value obtained during the (Continued)

operation of the first module, in response to the determination as to whether the first module has started operating; and operate the communication circuit according to a first value obtained by the compensation, wherein the first value obtained during the operation of the first module may contain a first noise value resulting from the operation of the first module. Various other embodiments are also possible.

13 Claims, 13 Drawing Sheets

(56) References Cited

U.S. PATENT DOCUMENTS

| | | | | |
|---|---|---|---|---|
| 9,191,050 | B1* | 11/2015 | Hwang | H04B 1/123 |
| 9,350,465 | B2 | 5/2016 | Chen et al. | |
| 10,062,954 | B2* | 8/2018 | Hong | H01Q 5/321 |
| 2006/0178157 | A1 | 8/2006 | Gebara et al. | |
| 2013/0162594 | A1* | 6/2013 | Paulsen | H01Q 1/48 |
| | | | | 345/173 |
| 2013/0201950 | A1* | 8/2013 | Wang | H04L 5/0037 |
| | | | | 370/329 |
| 2015/0126146 | A1 | 5/2015 | Wang et al. | |
| 2016/0173185 | A1 | 6/2016 | Kang et al. | |
| 2017/0033434 | A1 | 2/2017 | Hong et al. | |

FOREIGN PATENT DOCUMENTS

| | | |
|---|---|---|
| WO | 2013/096557 A1 | 6/2013 |
| WO | 2015/156577 A1 | 10/2015 |

OTHER PUBLICATIONS

Written Opinion of the International Searching Authority dated Feb. 19, 2020 in connection with International Patent Application No. PCT/KR2019/014895, 5 pages.

Korean Intellectual Property Office, "Request for the Submission of an Opinion", dated Dec. 12, 2022, in connection with Korean Patent Application No. 10-2018-0148461, 11 pages.

* cited by examiner

ELECTRONIC DEVICE COMPENSATIVELY ADJUSTING VALUE ACQUIRED BY ANTENNA, AND OPERATING METHOD THEREFOR

CROSS-REFERENCE TO RELATED APPLICATIONS

This application is a 371 of International Application No. PCT/KR2019/014895 filed on Nov. 5, 2019, which claims priority to Korean Patent Application No. 10-2018-0148461 filed on Nov. 27, 2018 in the Korean Intellectual Property Office, the disclosures of which are herein incorporated by reference in their entirety.

BACKGROUND

1. Field

Various embodiments relate to an electronic device which compensates for the effect of noise induced to an antenna so as to improve the reception performance of the antenna, and an operating method therefor.

2. Description of the Related Art

As a high-quality multimedia service is provided together with a voice communication service through a portable terminal for mobile communication, wireless communication technology is recently drawing much attention due to the convergence with a next-generation wireless communication service such as long term evolution (LTE). For smooth reception of a multimedia service provided by such wireless communication technology, a high data transmission rate is required to be ensured with respect to a huge volume of multimedia data. Therefore, research has continuously progressed on an antenna of a portable terminal suitable for the high data rate. A multiple-input multiple-output (MIMO) technology is a wireless transmission technology in which multiple antennas are used, and are individually operated, so that data can be transmitted at a higher data transmission/reception rate with lower probability of error. These MIMO antennas can efficiently use limited frequency resources by using a multi-antenna at a transmission/reception node.

SUMMARY

When a function of a module, such as a motor, an earphone jack, a camera, and a sensor, which are disposed around an antenna, is operated, or connection to an interface is detected, the module or the interface may generate various noises including electromagnetic waves. If the frequency band of the antenna overlaps with those of the noises generated by the module or interface disposed around the antenna, the noises are induced to the antenna, so that a noise may be included in a value measured in the antenna, and thus the performance of the antenna may degrade.

Various embodiments may provide an electronic device which may compensate for a value identified in an antenna, based on whether a module adjacently disposed around the antenna is operated, or whether an interface is connected, and an operating method therefor.

According to various embodiments, an electronic device may include: a communication circuit including a first antenna element and a second antenna element, and configured to identify a first value through the first antenna element and identify a second value through the second antenna element; a processor; and at least one memory, wherein the at least one memory may store instructions configured to, when executed, cause the processor to: identify whether operation of a first module adjacently disposed around the first antenna element has been started; in response to identification of a start of operation of the first module, compensate for the first value after the operation of the first module is started, by using the first value before the operation of the first module is started, or the second value after the operation of the first module is started; and perform operation of the communication circuit by using the compensated first value, and wherein the first value after the operation of the first module is started may include a first noise value generated by the operation of the first module.

According to various embodiments, an electronic device may include: a communication circuit including a first antenna element and a second antenna element, and configured to identify a first value through the first antenna element and identify a second value through the second antenna element; a processor; and at least one memory, wherein the at least one memory may store instructions configured to, when executed, cause the processor to: identify connection of an external electronic device to a first interface adjacently disposed around the first antenna element; in response to identification of connection of the external electronic device to the first interface, compensate for the first value after the connection to the first interface is identified, by using the first value before the connection to the first interface is identified, or the second value after the connection to the first interface is identified; and perform operation of the communication circuit by using the compensated first value, and wherein the first value after the external electronic device is connected may include a noise value generated by the connection of the external electronic device.

According to various embodiments, a method for compensating for a value measured by an antenna may include: identifying a first value through a first antenna element and identifying a second value through a second antenna element; identifying whether operation of a first module adjacently disposed around the first antenna element has been started; in response to identification of a start of operation of the first module, compensating for the first value after the operation of the first module is started, by using the first value before the operation of the first module is started, or the second value after the operation of the first module is started; and performing operation of a communication circuit by using the compensated first value, wherein the first value after the operation of the first module is started includes a first noise value generated by the operation of the first module.

According to various embodiments, a method for compensating for a value measured by an antenna may include: identifying a first value through a first antenna element and identifying a second value through a second antenna element; identifying connection of an external electronic device to a first interface adjacently disposed around the first antenna element; in response to identification of connection of the external electronic device to the first interface, compensating for the first value after the connection to the first interface is identified, by using the first value before the connection to the first interface is identified, or the second value after the connection to the first interface is identified; and performing operation of a communication circuit by using the compensated first value, wherein the first value after the external electronic device is connected includes a noise value generated by the connection of the external electronic device.

According to various embodiments, a value identified through an antenna is compensated based on the operation of a module or the connection to an interface, so that the performance of the antenna can be improved.

DETAILED DESCRIPTION

Figure 1:
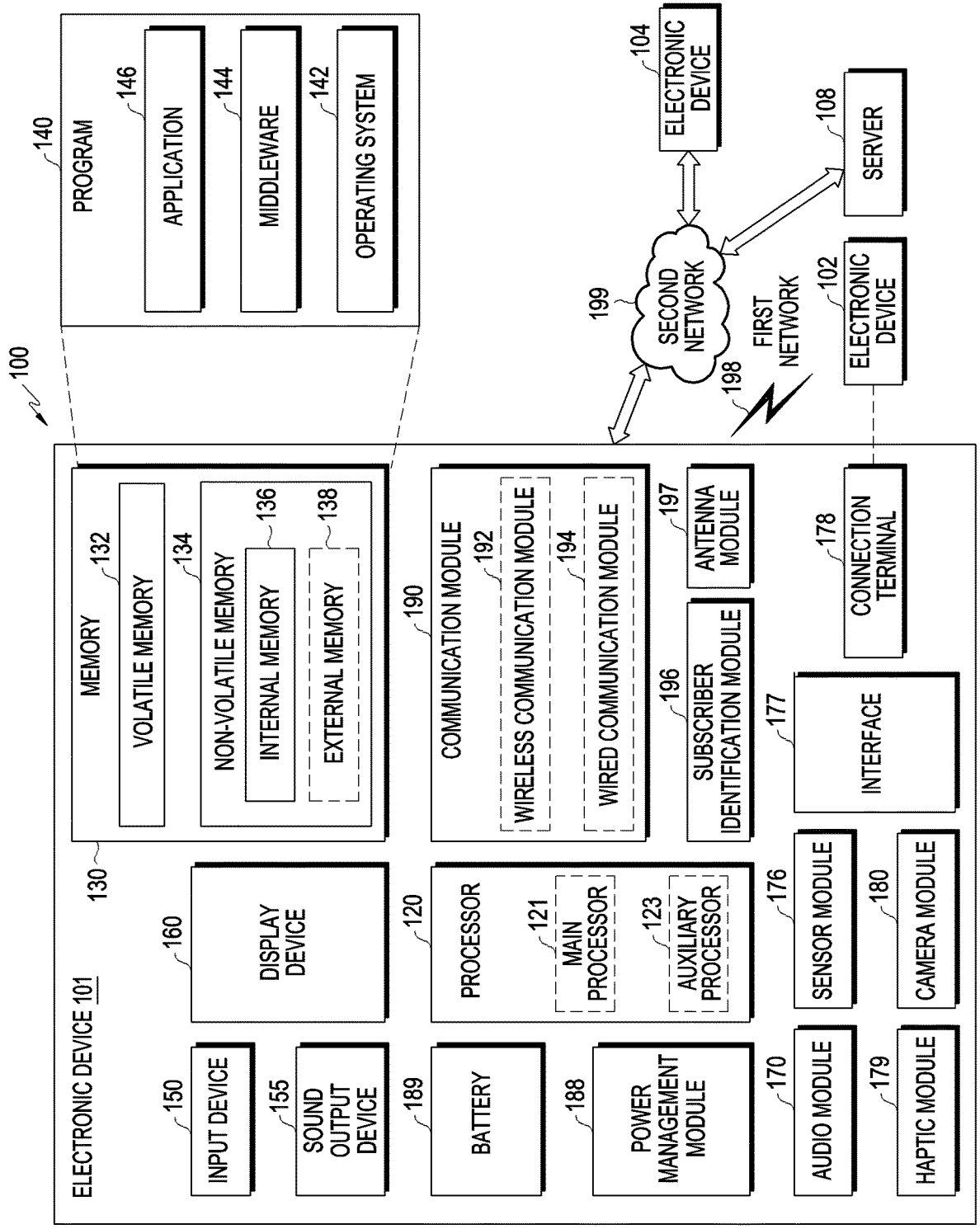
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
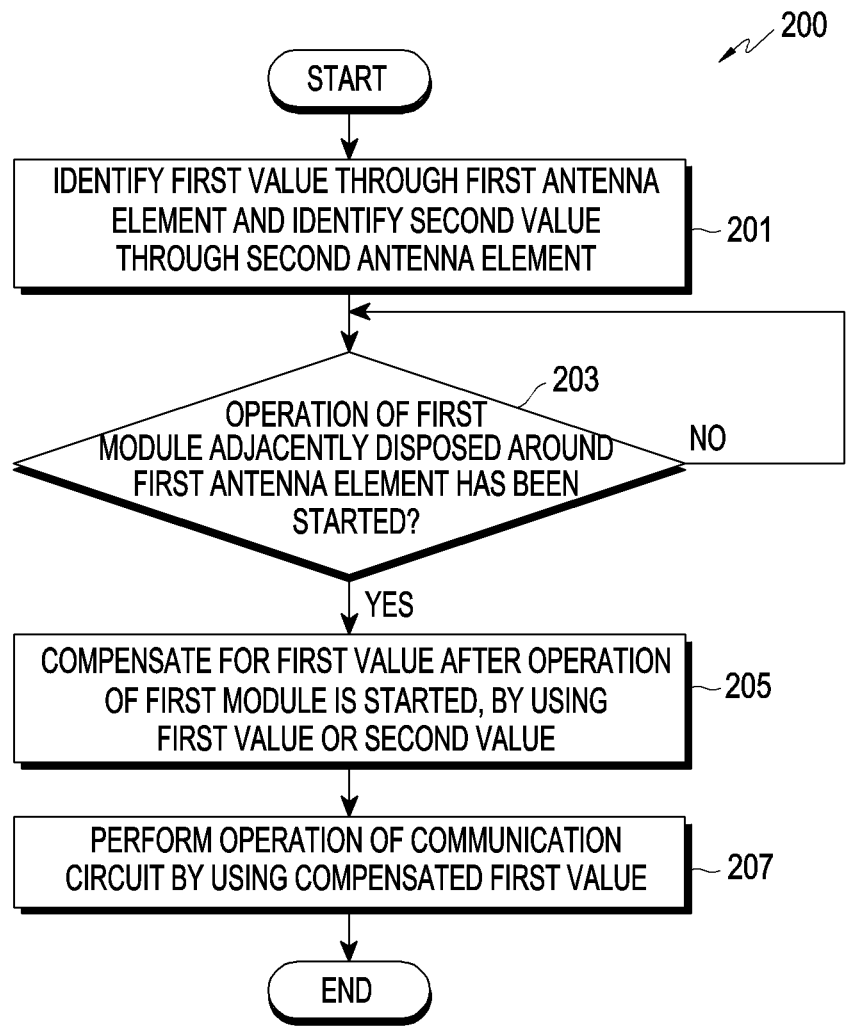
FIG. 2 is a flowchart illustrating a method in which an electronic device compensates for a first value identified through a first antenna element after operation of a first module is started, according to various embodiments.

FIG. 2 is a flowchart 200 illustrating a method in which an electronic device 101 compensates for a first value identified through a first antenna element after operation of a first module is started, according to various embodiments.

Figure 3A:
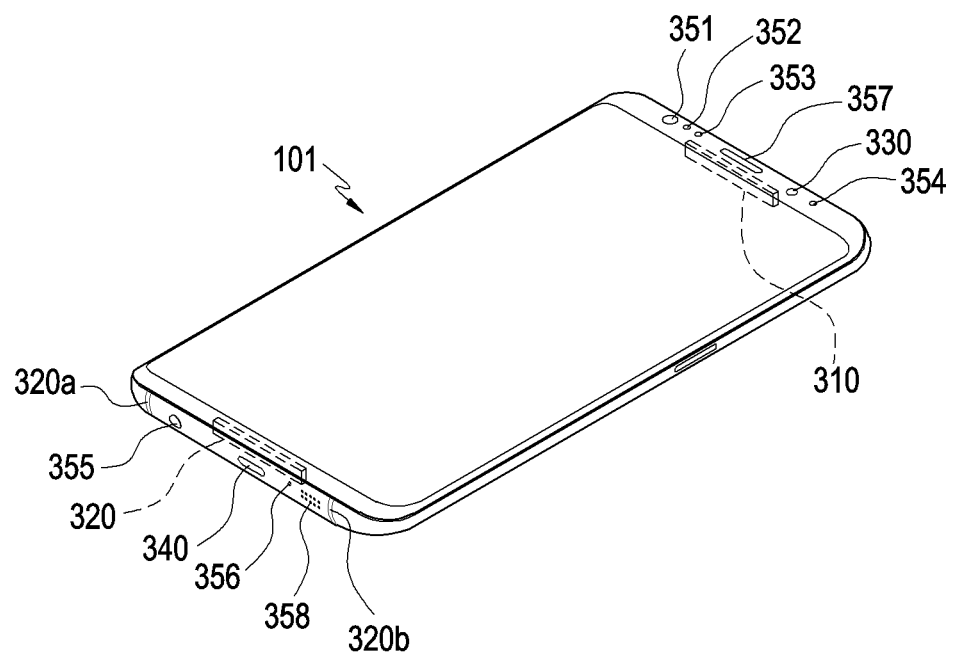
FIG. 3A is a diagram illustrating a first module adjacently disposed around a first antenna or a second antenna of an electronic device according to various embodiments.

FIG. 3A is a diagram illustrating the first module adjacently disposed around a first antenna 310 or a second antenna 320 of the electronic device 101 according to various embodiments.

Figure 3B:
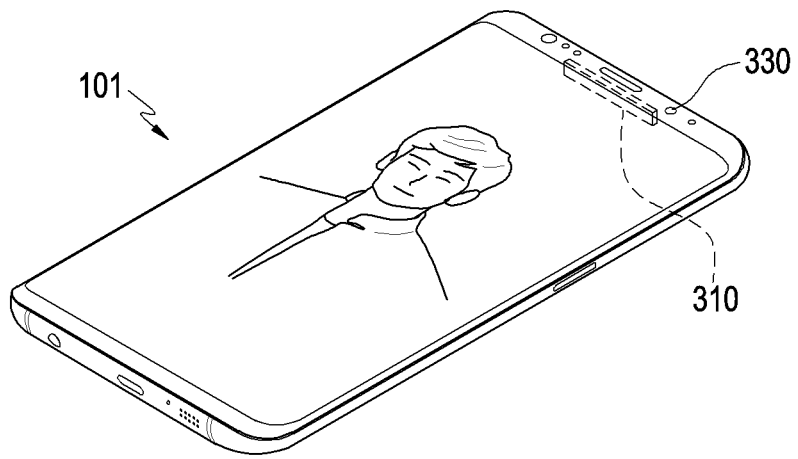
FIG. 3B is a diagram illustrating an embodiment in which a front camera adjacently disposed around a first antenna is operated, according to various embodiments.

FIG. 3B is a diagram illustrating an embodiment in which a front camera 330 adjacently disposed around the first antenna 310 is operated, according to various embodiments.

Figure 3C:
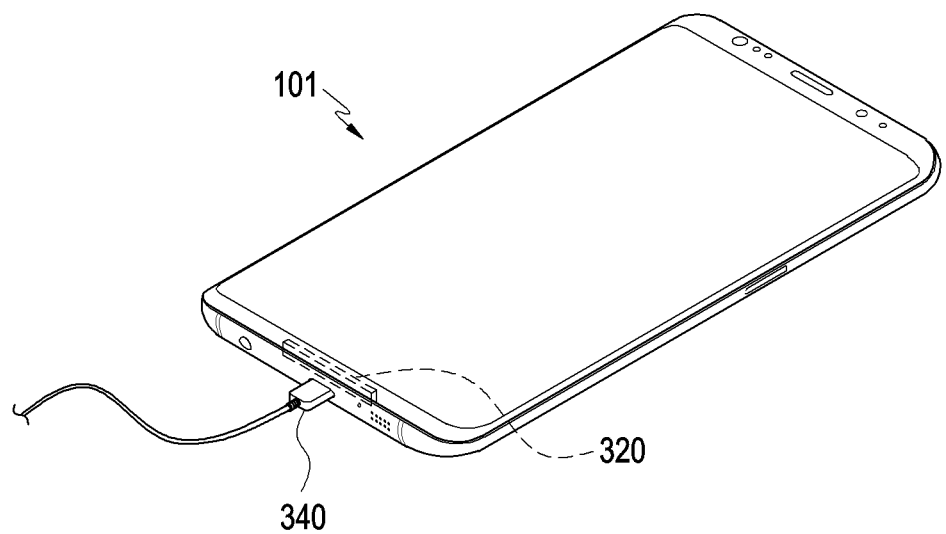
FIG. 3C is a diagram illustrating an embodiment in which a USB interface adjacently disposed around a second antenna is operated, according to various embodiments.

FIG. 3C is a diagram illustrating an embodiment in which a USB interface 340 adjacently disposed around the second antenna 320 is operated, according to various embodiments.

Figure 4:
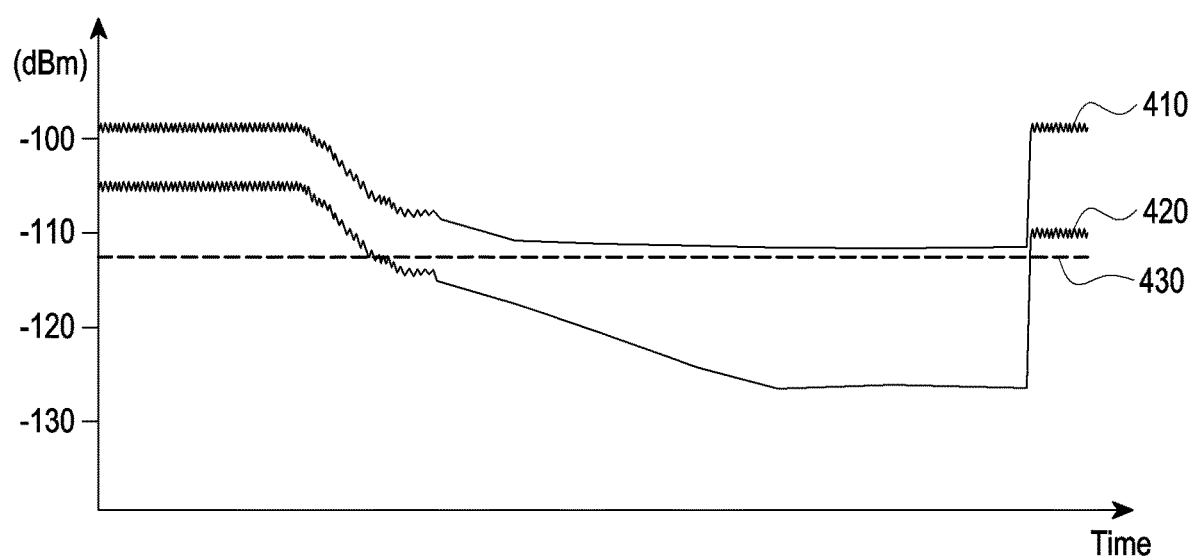
FIG. 4 is a graph showing a first value identified in a first antenna and a second value identified in a second antenna according to various embodiments.

FIG. 4 is a graph showing a first value 410 identified in the first antenna 310 and a second value 420 identified in the second antenna 320 according to various embodiments.

Figure 5A:
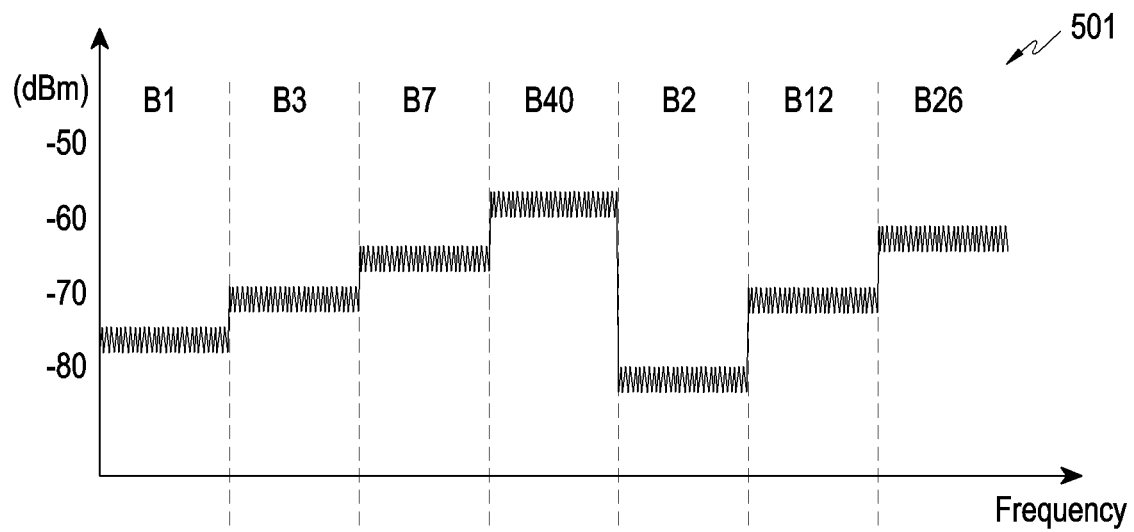
FIG. 5A is a graph showing a first value identified in a first antenna according to whether a front camera is operated, according to various embodiments.
Figure 5A:
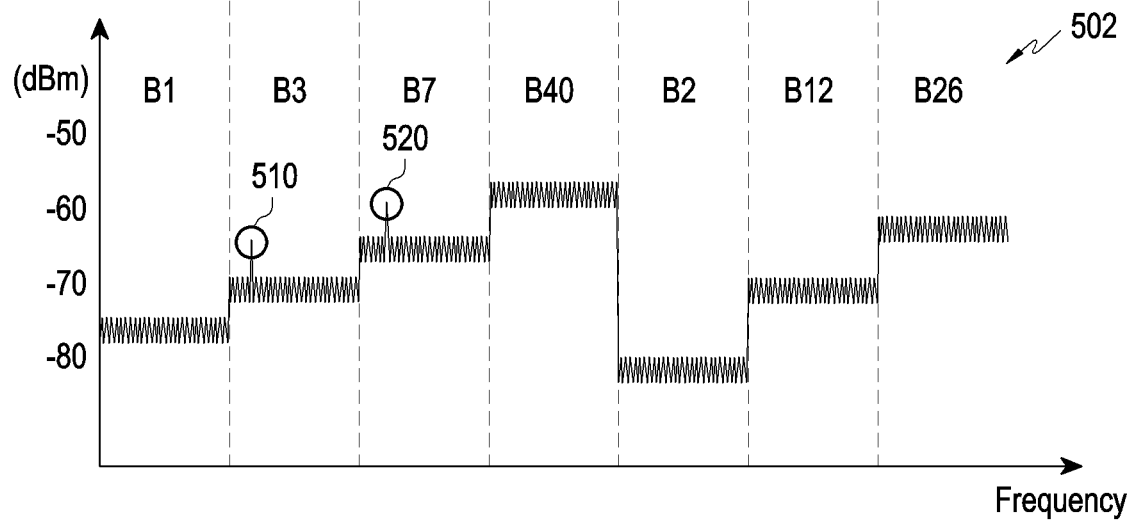

FIG. 5A is a graph showing a first value identified in the first antenna 310 according to whether the front camera 330 is operated, according to various embodiments.

Figure 5B:
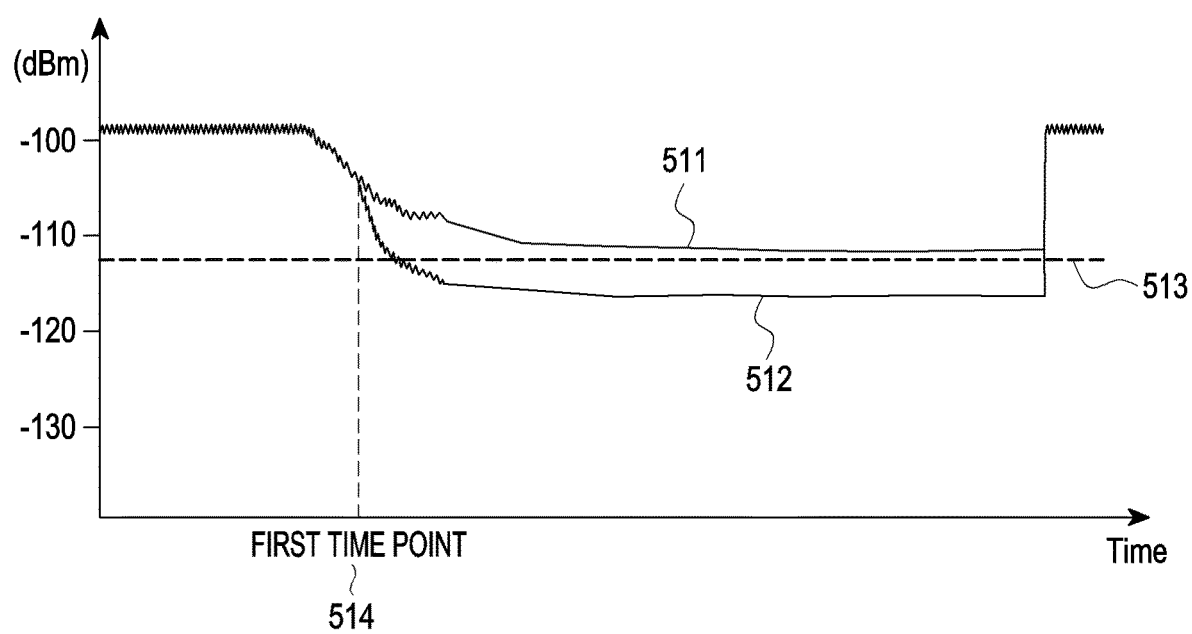
FIG. 5B is a graph illustrating an embodiment in which an electronic device performs a handover by using a compensated first value, according to various embodiments.

FIG. 5B is a graph illustrating an embodiment in which the electronic device 101 performs a handover by using a compensated first value, according to various embodiments.

Referring to FIG. 2 to FIG. 5B, in operation 201, according to various embodiments, an electronic device 101 (e.g., the processor 120 in FIG. 1) may identify a first value through a first antenna element (e.g., the antenna module 197 in FIG. 1) and identify a second value through a second antenna element (e.g., the antenna module 197 in FIG. 1). Referring to FIG. 3A, the first antenna element may be one of a first antenna 310 positioned at an upper end of the electronic device 101, or a second antenna 320 positioned at a lower end of the electronic device 101, and the second antenna element may be the other one of the first antenna 310 or the second antenna 320. The position of the first antenna 310 is not limited to the upper end of the electronic device 101, and may be within a partial area of the entire area including the lower end, the right side, the left side, and the middle of the electronic device. The position of the second antenna 320 is not limited to the lower end of the electronic device 101, and may be within a partial area of the entire area including the upper end, the right side, the left side, and the middle of the electronic device. The first antenna and the second antenna according to various embodiments may be positioned in the electronic device 101, or may be implemented in a housing of the electronic device 101 by being made of a metal material. For example, the second antenna 320 may be positioned in the electronic device 101, or may be implemented in a housing of the electronic device 101 over an area from reference numeral 320a to reference numeral 320b. According to various embodiments, the first antenna 310 and the second antenna 320 may include at least one antenna array. For example, the first antenna 310 and the second antenna 320 may include at least one diversity antenna and at least one primary antenna.

The electronic device 101 (e.g., the processor 120 in FIG. 1) according to various embodiments may identify a first value measured in the first antenna element, and identify a second value measured in the second antenna element. For example, referring to FIG. 4, the electronic device 101 may measure a first value 410 through the first antenna element, and measure a second value 420 through the second antenna element. The first value 410 and the second value 420 according to various embodiments may be measured in various schemes according to antenna characteristics. For example, the first value 410 and the second value 420 may be a value measured according to an S21 parameter characteristic or a value measured according to an antenna correlation characteristic. The first value 410 measured in the first antenna element, and the second value 420 measured in the second antenna element according to various embodiments may be of a received signal strength indicator (RSSI) type or a reference signal received power (RSRP) type. The electronic device 101 according to various embodiments may identify a first value through the first antenna element, and identify a second value through the second antenna element while performing operation 201 to operation 207 in FIG. 2.

The electronic device 101 (e.g., the processor 120 in FIG. 1) according to various embodiments may perform operation of a communication circuit 190 by using at least one of the first value identified through the first antenna element and the second value identified through the second antenna element. For example, referring to FIG. 4, if it is identified that at least one of the first value 410 identified through the first antenna element and the second value 420 identified through the second antenna element is equal to or lower than a threshold value 430, the electronic device 101 may perform a handover from a frequency band in which current communication is performed, to a different frequency band, and may perform communication by using the different frequency band.

In operation 203, according to various embodiments, the electronic device 101 (e.g., the processor 120 in FIG. 1) may identify whether operation of a first module adjacently disposed around the first antenna element is started. The first antenna element may be one of the first antenna 310 or the second antenna 320, and the first module may include modules adjacently disposed around the first antenna 310 or the second antenna 320. For example, referring to FIG. 3A, the first module may include at least one of a front camera 330, an USB interface 340, a status-indicating lamp 351, an iris sensor (not illustrated), an illuminance sensor 352, a proximity sensor 353, a light-emitting diode (LED) 354, an earphone jack interface 355, a microphone 356, a first speaker 357, a second speaker 358, a liquid crystal display (LCD) module (not illustrated), which are adjacently disposed around the first antenna 310 or the second antenna 320. The first module according to various embodiments is not limited to the above examples, and may include various modules or various interfaces adjacently disposed around the first antenna element.

When a function of the first module is turned on, the electronic device 101 (e.g., the processor 120 in FIG. 1) according to various embodiments may determine that operation of the first module has been started. Alternatively, when connection of an external electronic device to the first module is identified, the electronic device may determine that operation of the first module has been started. For example, referring to FIG. 3B, when a function of the front camera 330 adjacently disposed around the first antenna 310 is turned on according to a request by a camera application to execute the function of the front camera (e.g., the front camera 330 is turned on), the electronic device 101 may determine that operation of the first module adjacently disposed around the first antenna element has been started. As another example, referring to FIG. 3C, when connection of an external electronic device to the USB interface 340 adjacently disposed around the second antenna 320 is identified, the electronic device 101 may determine that operation of the first module adjacently disposed around the first antenna element has been started. A first value identified through the first antenna element after operation of the first module is started may include a value of a noise generated by the operation of the first module.

The electronic device 101 (e.g., the processor 120 in FIG. 1) according to various embodiments may identify a noise generated by operation of the first module. For example, referring to FIG. 5A, as shown in a graph indicated by reference numeral 501, the electronic device 101 may identify a first value for each frequency band (band 1 (B1) to band 40 (B40)) through the first antenna 310 before a function of the front camera 330 is turned on. When a function of the front camera 330 is turned on, the electronic device 101 may identify, as shown in a graph indicated by reference numeral 502, a first value for each frequency band (band 1 (B1) to band 40 (B40)) through the first antenna 310, and may compare the first value after the function of the front camera 330 is turned on, with the first value before the function thereof is turned on, so as to identify that noises 510 and 520 corresponding to operation of the front camera 330 occur within band 3 (B3) and band 7 (B7), respectively.

In operation 205, according to various embodiments, in response to identification of the start of operation of the first module, the electronic device 101 (e.g., the processor 120 in FIG. 1) may compensate for the first value after the operation of the first module is started, by using a first value identified in the first antenna element or a second value identified in the second antenna element. In response to identification of the start of operation of the first module, the electronic device 101 may compensate for a first value after the operation of the first module is started, by using a first value before the operation of the first module is started, or a second value after the operation of the first module is started.

The electronic device 101 (e.g., the processor 120 in FIG. 1) according to various embodiment may compensate for a first value after operation of the first module is started, by using a first value before the operation of the first module is started, or a second value after the operation of the first module is started. For example, in response to identification of the start of operation of the first module, the electronic device 101 may replace a first value after the operation of the first module is started, with a first value before the operation of the first module is started, so as to calculate a compensated first value. As another example, in response to identification of the start of operation of the first module, the electronic device 101 may replace a first value after operation of the first module is started, with a second value after the operation of the first module is started, so as to calculate a compensated first value. As another example, in response to identification of the start of operation of the first module, the electronic device 101 may apply a predetermined difference value corresponding to the operation of the first module to a second value after the operation of the first module is started, so as to calculate a compensated first value.

In response to a communication with another electronic device through the first antenna element, the electronic device 101 according to various embodiments may compensate for a first value after the communication using the first antenna element by using a first value before the communication using the first antenna element or a second value after the communication using the first antenna element.

If the electronic device 101 does not perform a compensation operation for removing, from a first value, a noise value generated by operation of the first module, there may occur a problem in which operation of the communication circuit is performed by using the first value including the noise value. For example, referring to FIG. 5B, the electronic device 101 may identify a first value 511 through the first antenna element, and when operation of the first module adjacently disposed around the first antenna element is started at a first time point 514 during the identification of the first value 511, the electronic device 101 may identify the first value 511 including a noise value. In a case where the electronic device 101 is configured to perform a handover when the first value 511 is lower than or equal to a threshold value 513, there may occur a problem that the first value 511 is identified to be higher than the threshold value 513 allowing a handover due to the noise value, and thus the electronic device 101 does not perform a handover.

In operation 207, according to various embodiments, the electronic device 101 (e.g., the processor 120 in FIG. 1) may perform operation of the communication circuit by using a compensated first value. The electronic device 101 according to various embodiments may perform a handover by using a compensated first value. For example, referring to FIG. 5B, in response to identifying that operation of the first module has been started at the first time point 514, the electronic device 101 may compensate for the first value 511 including a noise value corresponding to the operation of the first module, and may identify a compensated first value 512. In a case where the electronic device 101 is configured to perform a handover when the compensated first value 512 is lower than or equal to the threshold value 513, the electronic device 101 may identify that the compensated first value 512 is equal to or lower than the threshold value 513 allowing a handover, and then may perform a handover. The electronic device 101 may perform a low noise amplifier (LNA) operation or a 4Rx antenna operation by using the compensated first value. The electronic device 101 (e.g., the processor 120 in FIG. 1) according to various embodiments may finish compensating for the first value in response to identification of the end of the operation of the first module.

Figure 6:
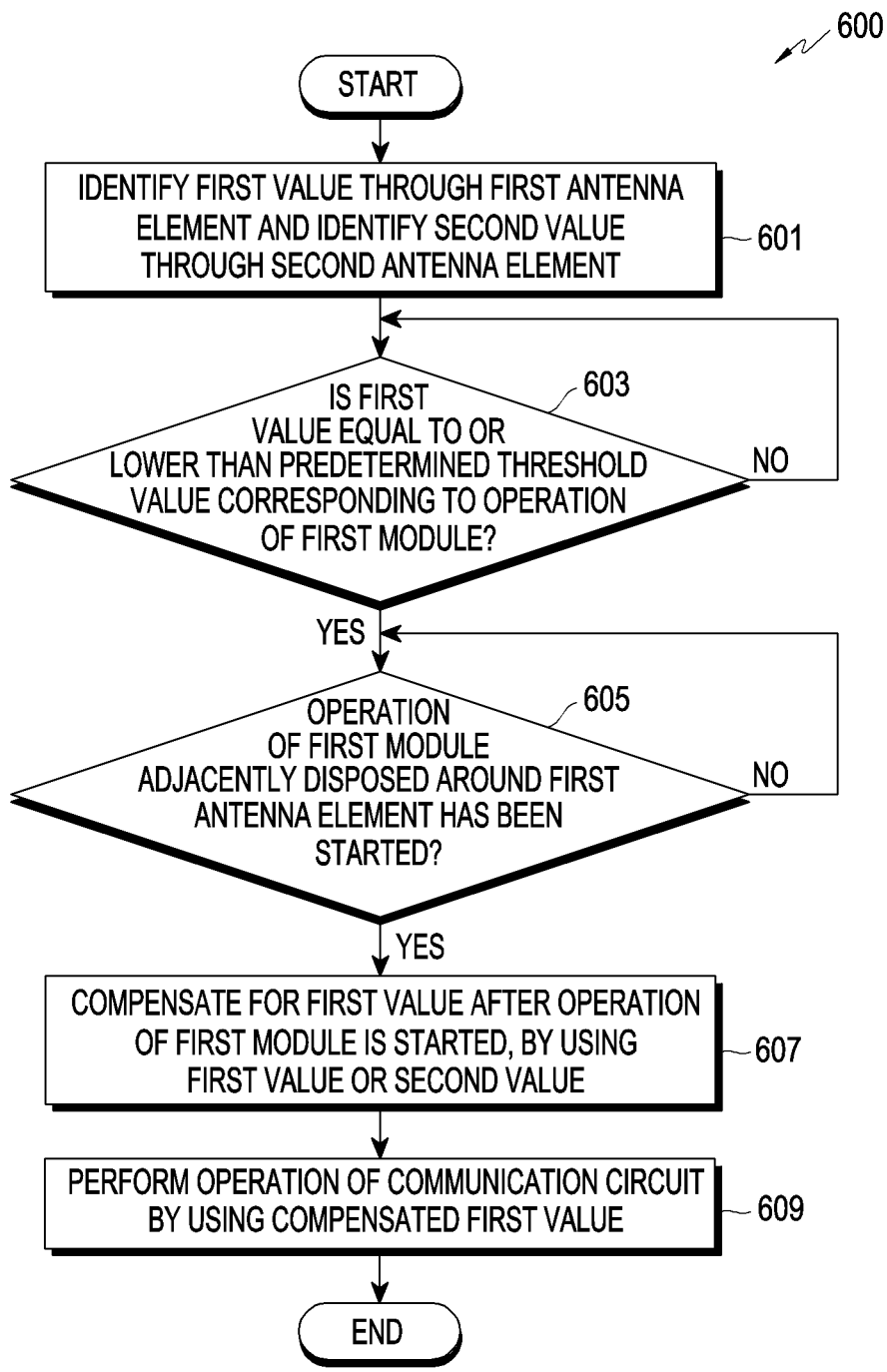
FIG. 6 is a flowchart illustrating, in detail, an operation in which an electronic device identifies whether a first value identified through a first antenna element is equal to or lower than a predetermined threshold value corresponding to operation of a first module, according to various embodiments.

FIG. 6 is a flowchart 600 illustrating, in detail, an operation in which the electronic device 101 identifies whether a first value identified through the first antenna element is equal to or lower than a predetermined threshold value corresponding to operation of the first module, according to various embodiments.

In operation 601, according to various embodiments, the electronic device 101 (e.g., the processor 120 in FIG. 1) may identify a first value through the first antenna element (e.g., the antenna module 197 in FIG. 1) and identify a second value through the second antenna element (e.g., the antenna module 197 in FIG. 1). Operation 601 is an operation corresponding to operation 201 in FIG. 2, and the electronic device 101 may perform operation 601 by using operation 201 in FIG. 2.

In operation 603, according to various embodiments, the electronic device 101 (e.g., the processor 120 in FIG. 1) may identify whether the first value is equal to or lower than a predetermined threshold value corresponding to operation of the first module. When the first value identified through the first antenna element exceeds the predetermined threshold value, a noise value generated by the operation of the first module is a small value compared to the first value. Therefore, even when the first value including the noise value is used, operation of the communication circuit is not affected thereby. Therefore, the power consumed by compensating for the first value, and the calculation amount of the processor 120 can be reduced. The electronic device 101 according to various embodiments may identify whether the first value is equal to or lower than at least one threshold value corresponding to operation of at least one module at at least one frequency. For example, the electronic device 101 may identify whether the first value is equal to or lower than a first threshold value corresponding to the operation of a function of the front camera 330 within a first frequency band, and may identify that the first value is equal to or lower than a second threshold value corresponding to the operation of a function of the front camera 330 within a second frequency band. As another example, the electronic device 101 may identify whether the first value is equal to or lower than a third threshold value corresponding to the operation of a function of the proximity sensor 353 within a first frequency band, and may identify that the first value is equal to or lower than a fourth threshold value corresponding to the operation of a function of the proximity sensor 353 within a second frequency band. The electronic device 101 (e.g., the memory 130 in FIG. 1) according to various embodiments may store, in advance, a lookup table including at least one threshold value corresponding to operation of at least one module at at least one frequency. For example, the electronic device 101 may store, in advance, a lookup table including a predetermined first threshold value corresponding to operation of the first module within a first frequency band, a predetermined second threshold value corresponding to operation of the second module within the first frequency band, a predetermined third threshold value corresponding to operation of the first module within a second frequency band, and a predetermined fourth threshold value corresponding to operation of the second module within the second frequency band. The electronic device 101 may identify a threshold value corresponding to a particular module at a particular frequency from the lookup table.

In operation 605, according to various embodiments, in response to the first value being equal to or lower than the predetermined threshold value corresponding to the operation of the first module, the electronic device 101 (e.g., the processor 120 in FIG. 1) may identify whether the operation of the first module adjacently disposed around the first antenna element has been started. The operation of identifying whether the operation of the first module has been started in operation 605 is an operation corresponding to operation 203 in FIG. 2, and the electronic device 101 may perform operation 605 by using operation 203 in FIG. 2.

In operation 607, according to various embodiments, in response to identification of the start of the operation of the first module, the electronic device 101 (e.g., the processor 120 in FIG. 1) may compensate for a first value after the operation of the first module is started, by using the first value identified in the first antenna element or the second value identified in the second antenna element. Operation 607 is an operation corresponding to operation 205 in FIG. 2, and the electronic device 101 may perform operation 607 by using operation 205 in FIG. 2.

In operation 609, according to various embodiments, the electronic device 101 (e.g., the processor 120 in FIG. 1) may perform operation of the communication circuit by using the compensated first value. Operation 609 is an operation corresponding to operation 207 in FIG. 2, and the electronic device 101 may perform operation 609 by using operation 207 in FIG. 2. The electronic device 101 (e.g., the processor 120 in FIG. 1) according to various embodiments may finish compensating for the first value in response to identification of the end of the operation of the first module.

Figure 7:
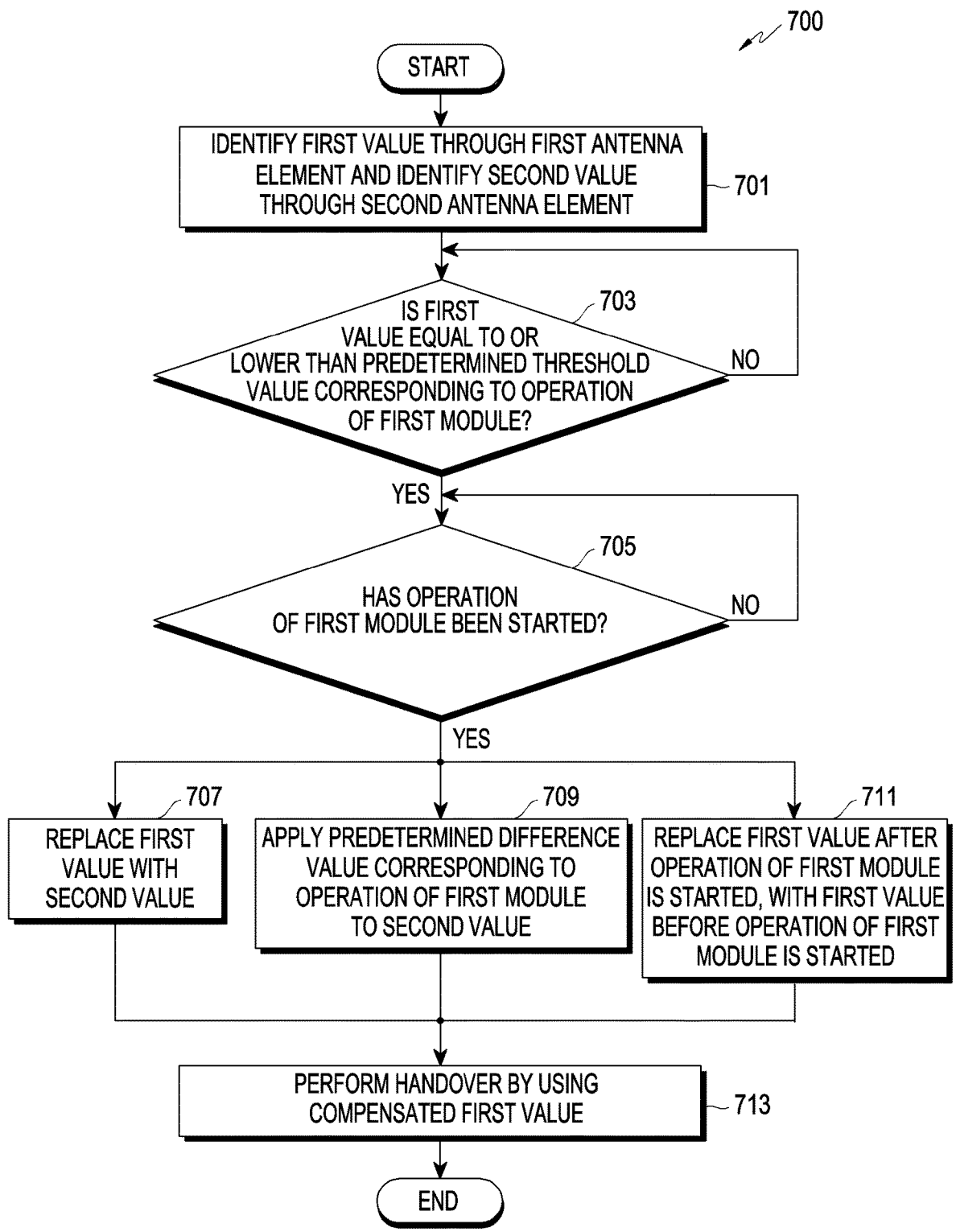
FIG. 7 is a flowchart illustrating, in detail, an operation in which an electronic device compensates for a first value after operation of a first module is started, according to various embodiments.

FIG. 7 is a flowchart 700 illustrating, in detail, an operation in which the electronic device 101 compensates for a first value after operation of the first module is started, according to various embodiments.

In operation 701, according to various embodiments, the electronic device 101 (e.g., the processor 120 in FIG. 1) may identify a first value through the first antenna element (e.g., the antenna module 197 in FIG. 1) and identify a second value through the second antenna element (e.g., the antenna module 197 in FIG. 1). Operation 701 is an operation corresponding to operation 201 in FIG. 2, and the electronic device 101 may perform operation 701 by using operation 201 in FIG. 2.

In operation 703, according to various embodiments, the electronic device 101 (e.g., the processor 120 in FIG. 1) may identify whether the first value is equal to or lower than a predetermined threshold value corresponding to operation of the first module. Operation 703 is an operation corresponding to operation 603 in FIG. 6, and the electronic device 101 may perform operation 703 by using operation 603 in FIG. 6.

In operation 705, according to various embodiments, in response to the first value being equal to or lower than the predetermined threshold value, the electronic device 101 (e.g., the processor 120 in FIG. 1) may identify whether the operation of the first module has been started. The operation of identifying whether the operation of the first module has been started in operation 705 is an operation corresponding to operation 203 in FIG. 2, and the electronic device 101 may perform operation 705 by using operation 203 in FIG. 2.

In operation 707, according to various embodiments, in response to identification of the start of the operation of the first module, the electronic device 101 (e.g., the processor 120 in FIG. 1) may replace a first value after the operation of the first module is started, with a second value after the operation of the first module is started, during the operation of the first module, so as to calculate a compensated first value. For example, referring to Table 1, when a function of the front camera 330 is turned on at time point t3, the electronic device 101 may calculate a compensated first value (c) (e.g., −100, −105, −110, and −115) by replacing a first value (a) (e.g., −100, −100, −100, and −100) identified through the first antenna element adjacently disposed around the front camera 330 with a second value (d) (e.g., −100, −105, −110, and −115) identified through the second antenna element. In Table 1, after a function of the front camera 330 is turned on, a first value (a) before a compensation is a value measured in the first antenna 310 as raw data, and the first value (a) includes a noise value.

TABLE 1

| Time | Before compensation for first value (Unit: dBm) | | After compensation for first value (Unit: dBm) | |
|---|---|---|---|---|
| | First value (a) | Second value (b) | First value (c) | Second value (d) |
| t1 | −90 | −90 | −90 | −90 |
| t2 | −95 | −95 | −95 | −95 |
| t3 | −100 | −100 | −100 | −100 |
| t4 | −100 | −105 | −105 | −105 |
| t5 | −100 | −110 | −110 | −110 |
| t6 | −100 | −115 | −115 | −115 |

In operation 709, according to various embodiments, in response to identification of the start of the operation of the first module, the electronic device 101 (e.g., the processor 120 in FIG. 1) may apply a predetermined difference value corresponding to the operation of the first module, to a second value after the operation of the first module is started, during the operation of the first module, so as to calculate a compensated first value. For example, referring to Table 2, the electronic device 101 may identify that a difference value between a first value (a) and a second value (b) before a function of the front camera 330 is turned on is 10 dBm, and may store the difference value. The electronic device 101 may calculate a compensated first value (e) by applying the 10 dBm difference value corresponding to the operation of the front camera 330, to a second value (f) identified after the function of the front camera 330 is turned on, while the function of the front camera 330 is being performed. In Table 2, after the function of the front camera 330 is turned on, a first value (c) before the compensation is a value measured in the first antenna 310 as raw data, and the first value (c) includes a noise value.

TABLE 2

| Before operation of front camera (Unit: dBm) | | Before compensation for first value after operation of front camera (Unit: dBm) | | After compensation for first value after operation of front camera (Unit: dBm) | |
|---|---|---|---|---|---|
| First value (a) | Second value (b) | First value (c) | Second value (d) | First value (e) | Second value (f) |
| −90 | −100 | −70 | −95 | −85 | −95 |

The electronic device 101 (e.g., the memory 130 in FIG. 1) according to various embodiments may store, in advance, a lookup table including at least one predetermined difference value corresponding to operation of at least one module at at least one frequency. For example, the electronic device 101 may store, in advance, a lookup table including a predetermined first difference value corresponding to operation of the first module within a first frequency band, a predetermined second difference value corresponding to operation of the second module within the first frequency band, a predetermined third difference value corresponding to operation of the first module within a second frequency band, and a predetermined fourth difference value corresponding to operation of the second module within the second frequency band. The electronic device 101 may compensate for a first value by using the pre-stored lookup table.

In operation 711, according to various embodiments, in response to identification of the start of the operation of the first module, the electronic device 101 (e.g., the processor 120 in FIG. 1) may replace a first value after the operation of the first module is started, with a first value before the operation of the first module is started, so as to calculate a compensated first value. For example, in a case where a first value before a function of the front camera 330 is turned on is −100 dBm, and a first value including a noise value after the function of the front camera 330 is turned on is −110 dBm, the electronic device 101 may calculate a compensated first value by replacing the first value of −110 dBm with the value of −100 dBm in response to identifying that the function of the front camera 330 has been turned on.

In operation 713, according to various embodiments, the electronic device 101 (e.g., the processor 120 in FIG. 1) may perform operation of the communication circuit by using the compensated first value. The electronic device 101 according to various embodiments may perform a handover by using a first value compensated in operation 707, operation 709, and operation 711. The electronic device 101 (e.g., the processor 120 in FIG. 1) according to various embodiments may finish compensating for the first value in response to identification of the end of the operation of the first module.

The electronic device 101 (e.g., the processor 120 in FIG. 1) according to various embodiments of the disclosure may select one of operation 707, operation 709, and operation 711 according to a priority preconfigured by a system, or an input received from a user, and may perform a compensation using a selected operation.

Figure 8A:
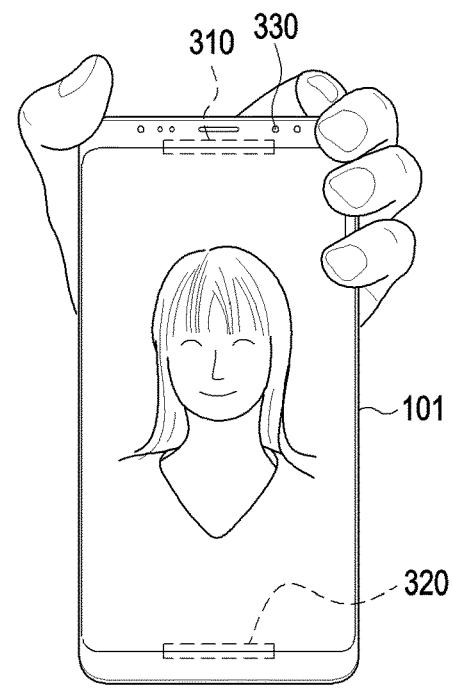
FIG. 8A is a diagram illustrating an embodiment of additionally compensating for a compensated first value when a part of an electronic device, which is gripped by a user during operation of a first module, corresponds to a part in which a first antenna element is positioned, according to various embodiments.

FIG. 8A is a diagram illustrating an embodiment of additionally compensating for a compensated first value when a part of the electronic device 101, which is gripped by a user during operation of the first module, corresponds to a part in which the first antenna element is positioned, according to various embodiments.

Figure 8B:
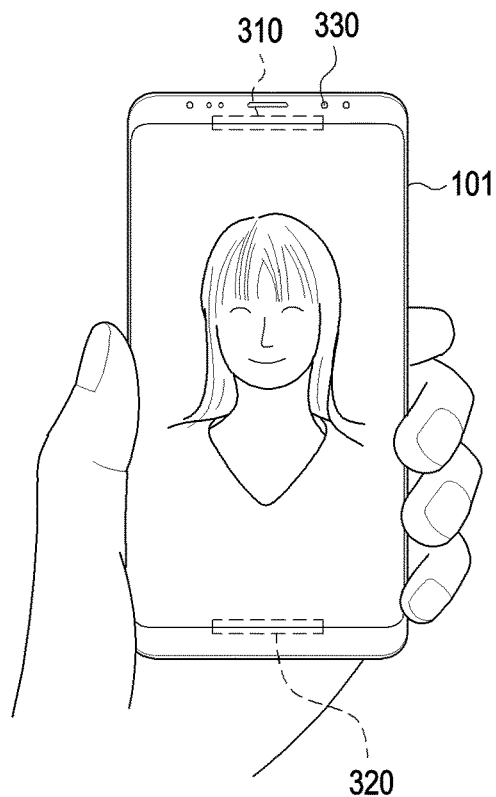
FIG. 8B is a diagram illustrating an embodiment of compensating for a second value when a part of an electronic device, which is gripped by a user during operation of a first module, corresponds to a part in which a second antenna element is positioned, according to various embodiments.

FIG. 8B is a diagram illustrating an embodiment of compensating for a second value when a part of the electronic device 101, which is gripped by a user during operation of the first module, corresponds to a part in which the second antenna element is positioned, according to various embodiments.

Referring to FIG. 8A, according to various embodiments, the electronic device 101 may identify a part of the electronic device 101, which is gripped by a user, during operation of the first module. The electronic device 101 according to an embodiment may identify a gripped part of the electronic device 101 through a grip sensor while a function of the front camera 330 is being performed. While a function of the front camera 330 is being performed, the electronic device 101 according to an embodiment may identify a gripped part of the electronic device 101 by using a reflective wave identified through a coupler included in the antenna module 197. For example, the electronic device 101 may identify a reflective wave of a transmission signal through a coupler connected to the first antenna element, and may identify a gripped part of the electronic device 101, based on a characteristic (e.g., intensity) of the reflective wave. If the intensity of the reflective wave is equal to or larger than a predetermined value, the electronic device 101 may determine that a part in which the coupler is positioned is the part of the electronic device 101, which is gripped by the user.

According to various embodiments, in response to identifying that the gripped part of the electronic device 101 corresponds to the part in which the first antenna element is positioned, the electronic device 101 may additionally compensate for a compensated first value by using a preconfigured first value. For example, in response to identifying that the gripped part of the electronic device 101 corresponds to the part in which the first antenna 310 is positioned, the electronic device 101 may additionally apply a preconfigured first value (e.g., 3 dBm) to the compensated first value so as to calculate an additionally compensated first value.

According to various embodiments, in response to identifying that the gripped part of the electronic device 101 corresponds to the part in which the second antenna element is positioned, the electronic device 101 may compensate for a second value identified through the second antenna element by using a preconfigured first value. For example, in response to identifying that the gripped part of the electronic device 101 corresponds to the part in which the second antenna 320 is positioned, the electronic device 101 may apply a preconfigured first value (e.g., 3 dBm) to the second value so as to calculate a compensated second value.

Figure 9:
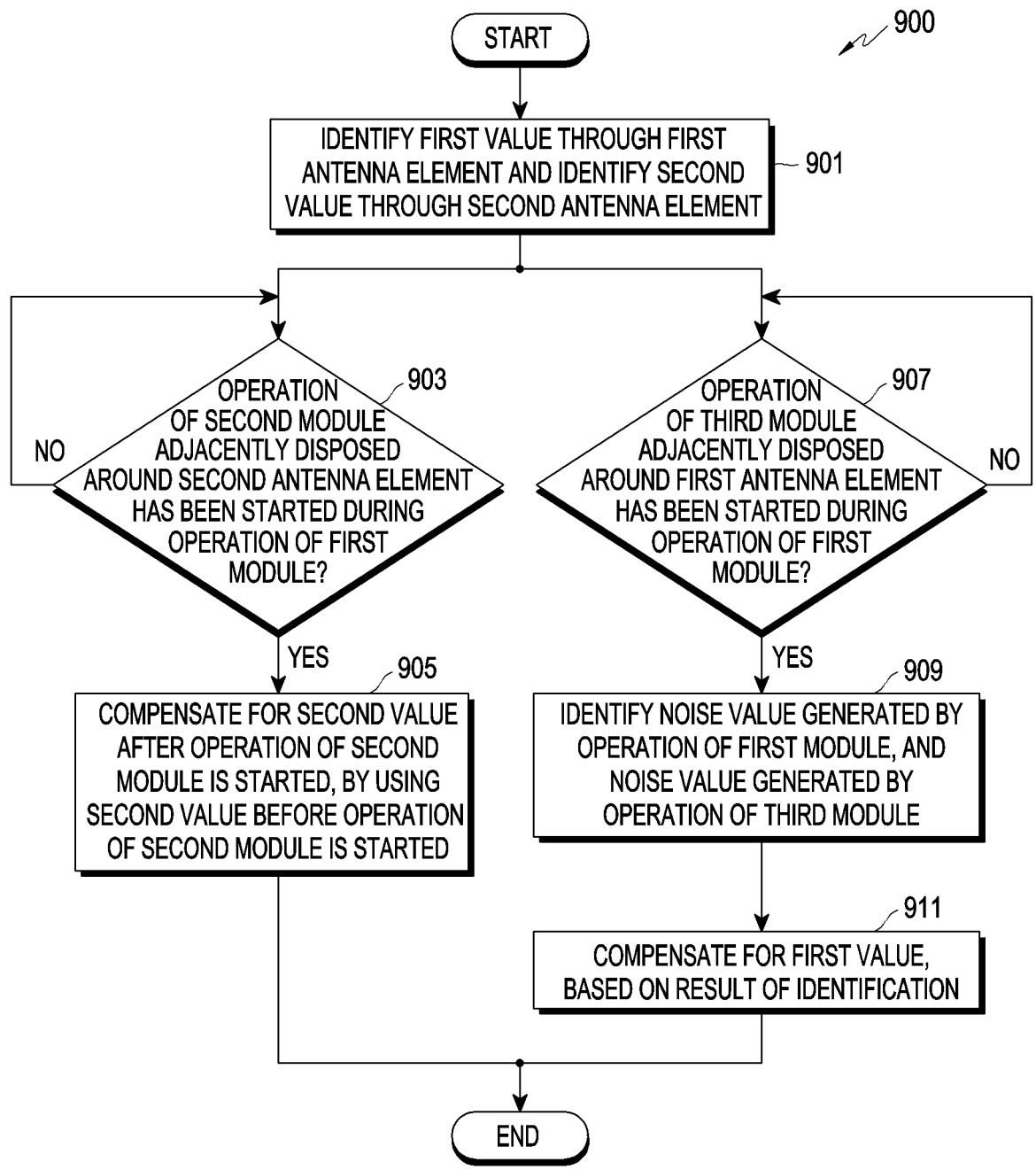
FIG. 9 is a flowchart illustrating a method in which an electronic device compensates for a second value, based on operation of a second module adjacently disposed around a second antenna element, and compensates for a first value, based on operation of a third module adjacently disposed around a first antenna element, according to various embodiments.

FIG. 9 is a flowchart 900 illustrating a method in which the electronic device 101 compensates for a second value, based on operation of the second module adjacently disposed around the second antenna element, and compensates for a first value, based on operation of a third module adjacently disposed around the first antenna element, according to various embodiments.

In operation 901, according to various embodiments, the electronic device 101 (e.g., the processor 120 in FIG. 1) may identify a first value through the first antenna element, and identify a second value through the second antenna element. Operation 901 is an operation corresponding to operation 201 in FIG. 2, and the electronic device 101 may perform operation 901 by using operation 201 in FIG. 2.

In operation 903, according to various embodiments, the electronic device 101 (e.g., the processor 120 in FIG. 1) may identify whether operation of the second module adjacently disposed around the second antenna element has been started during operation of the first module. The first module may include modules adjacently disposed around the first antenna element, and the second module may include modules adjacently disposed around the second antenna element. For example, in a case where the first antenna element corresponds to the first antenna 310 positioned at the upper end of the electronic device 101 among the first antenna 310 and the second antenna 320, the first module is the front camera 330 adjacently disposed around the first antenna 310, the second antenna element is the second antenna 320 positioned at the lower end of the electronic device 101, and the second module is the microphone 356 adjacently disposed around the second antenna 320.

The electronic device 101 (e.g., the processor 120 in FIG. 1) according to various embodiments may identify whether operation of the second module has been started during operation of the first module. For example, the electronic device 101 may identify that a function of the microphone 356 is turned on while a function of the front camera 330 is being performed. The operation of identifying whether the operation of the second module has been started may correspond to the operation of identifying whether the operation of the first module has been started in operation 203 in FIG. 2, and the electronic device 101 may perform operation 903 by using operation 203 in FIG. 2.

In operation 905, according to various embodiments, in response to identifying that the operation of the second module has been started during the operation of the first module, the electronic device 101 (e.g., the processor 120 in FIG. 1) may compensate for a second value after the operation of the second module is started, by using a second value before the operation of the second module is started. The electronic device 101 may calculate a compensated second value by replacing a second value after the operation of the second module is started, with a second value before the operation of the second module is started. For example, in response to identifying that a function of the microphone 356 adjacently disposed around the second antenna 320 has been turned on during operation of the front camera 330 adjacently disposed around the first antenna 310, the electronic device 101 may replacing a second value identified through the second antenna 320 after the function of the microphone 356 is turned on, with a second value identified through the second antenna 320 before the function of the microphone 356 is turned on, so as to calculate a compensated second value. The electronic device 101 according to various embodiments may perform operation of the communication circuit by using at least one of the compensated first value and the compensated second value. The electronic device 101 (e.g., the processor 120 in FIG. 1) according to various embodiments may finish compensating for the second value in response to identification of the end of the operation of the second module.

In operation 907, according to various embodiments, the electronic device 101 (e.g., the processor 120 in FIG. 1) may identify whether operation of the third module adjacently disposed around the first antenna element has been started during operation of the first module. The first module and the third module may include modules adjacently disposed around the first antenna element. For example, in a case where the first antenna element corresponds to the first antenna 310 positioned at the upper end of the electronic device 101 among the first antenna 310 and the second antenna 320, the first module is the front camera 330 adjacently disposed around the first antenna 310, and the third module is the proximity sensor 353 adjacently disposed around the first antenna 310.

The electronic device 101 (e.g., the processor 120 in FIG. 1) according to various embodiments may identify whether operation of the third module has been started during operation of the first module. For example, the electronic device 101 may identify that a function of the proximity sensor 353 is turned on while a function of the front camera 330 is being performed. The operation of identifying whether the operation of the third module has been started in operation 605 may correspond to the operation of identifying whether the operation of the first module has been started in operation 203 in FIG. 2, and the electronic device 101 may perform operation 907 by using operation 203 in FIG. 2.

In operation 909, according to various embodiments, in response to identifying that the operation of the third module has been started during the operation of the first module, the electronic device 101 (e.g., the processor 120 in FIG. 1) may identify a first noise value generated by the operation of the first module, and a second noise value generated by the operation of the third module. The electronic device 101 according to various embodiments may store, in advance, a lookup table including at least one noise value corresponding to operation of at least one module at at least one frequency, and may identify a noise value corresponding to operation of a particular module at a particular frequency from the pre-stored lookup table. For example, the electronic device 101 may identify, from the pre-stored lookup table, a first noise value corresponding to operation of the front camera 330 within a first frequency band, a second noise value corresponding to operation of the proximity sensor 353 within the first frequency band, a third noise value corresponding to operation of the front camera 330 within a second frequency band, and a fourth noise value corresponding to operation of the proximity sensor 353 within the second frequency band. The electronic device 101 according to various embodiments may compare a first noise value generated by the operation of the first module with a second noise value generated by the operation of the third module.

In operation 911, according to various embodiments, the electronic device 101 (e.g., the processor 120 in FIG. 1) may compensate for a first value, based on a result of the identification.

When the result of comparison between the first noise value generated by the operation of the first module and the second noise value generated by the operation of the third module shows that the first noise value is equal to or higher than the second noise value, the electronic device 101 (e.g., the processor 120 in FIG. 1) according to various embodiment may maintain an operation of compensating for a first value after the operation of the first module is started. The operation of compensating for the first value after the operation of the first module is started in operation 911 may include operation 205 in FIG. 2, and operation 707, operation 709, and operation 711 in FIG. 7.

If the first noise value is lower than the second noise value, the electronic device 101 (e.g., the processor 120 in FIG. 1) according to various embodiment may compensate for a first value after the third module is started, by using a first value before the first module is started, or a second value after the third module is started. For example, if the first noise value is lower than the second noise value, the electronic device may calculate a compensated first value by replacing a first value after the operation of the third module is started, with a first value before the operation of the first module is started. As another example, if the first noise value is lower than the second noise value, the electronic device 101 may calculate a compensated first value by replacing a first value after the operation of the third module is started, with a second value after the operation of the third module is started. As another example, if the first noise value is lower than the second noise value, the electronic device 101 may calculate a compensated first value by applying a predetermined difference value corresponding to the operation of the third module to a second value after the operation of the third module is started. The electronic device 101 according to various embodiments may perform operation of the communication circuit 190 by using the compensated first value.

Figure 10:
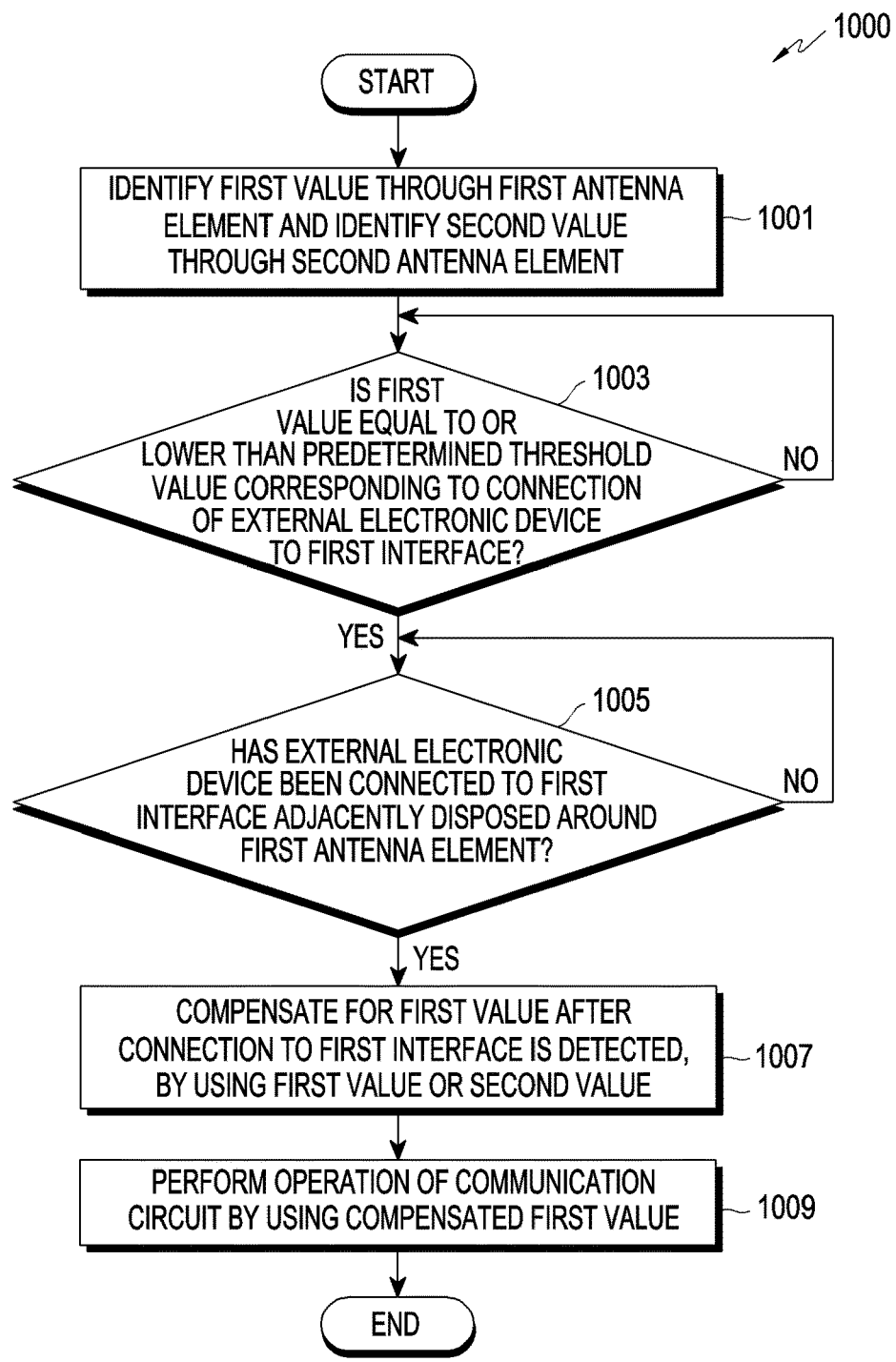
FIG. 10 is a flowchart illustrating a method in which an electronic device compensates for a first value which is identified through a first antenna element after connection of an external electronic device to a first interface is detected, according to various embodiments.

FIG. 10 is a flowchart 1000 illustrating a method in which the electronic device 101 compensates for a first value which is identified through the first antenna element after connection of an external electronic device to a first interface is identified, according to various embodiments.

Figure 11:
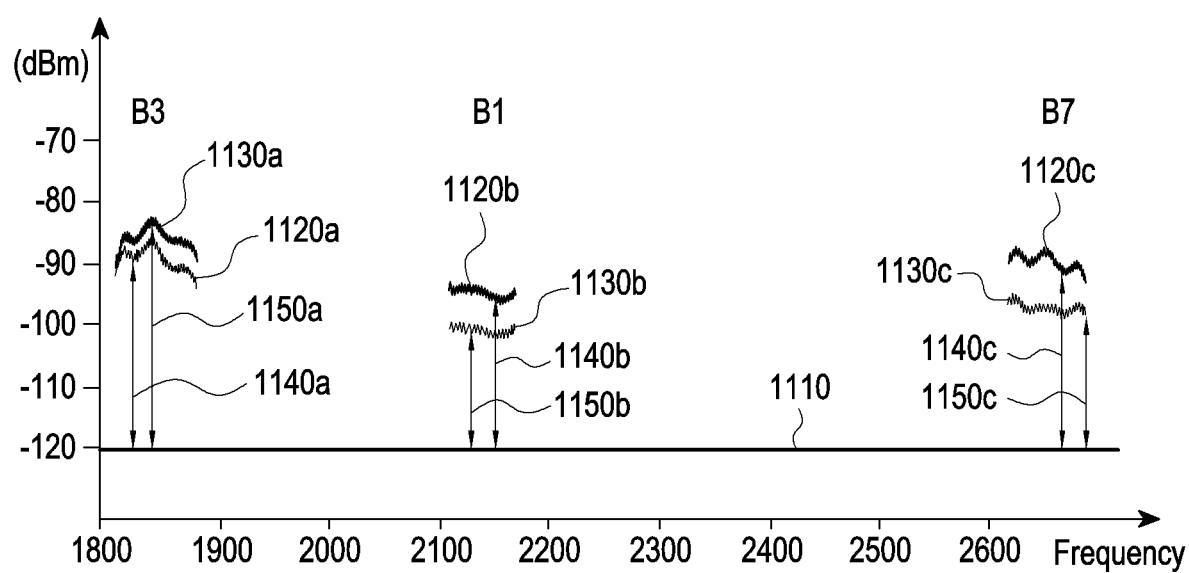
FIG. 11 is a graph showing a first value which is measured in a first antenna element after connection of an external electronic device to a first interface is detected, and is not compensated, according to various embodiments.

FIG. 11 is a graph showing a first value which is measured in the first antenna element after connection of the external electronic device to the first interface is identified, and is not compensated, according to various embodiments.

Referring to FIG. 10, in operation 1001, according to various embodiments, the electronic device 101 (e.g., the processor 120 in FIG. 1) may identify a first value through the first antenna element (e.g., the antenna module 197 in FIG. 1), and may identify a second value through the second antenna element (e.g., the antenna module 197 in FIG. 1). The first antenna element may be one of the first antenna 310 positioned at an upper end of the electronic device 101, or the second antenna 320 positioned at a lower end of the electronic device 101, and the second antenna element may be the other one of the first antenna 310 or the second antenna 320. Operation 1001 is an operation corresponding to operation 201 in FIG. 2, and the electronic device 101 may perform operation 1001 by using operation 201 in FIG. 2.

In operation 1003, according to various embodiments, the electronic device 101 (e.g., the processor 120 in FIG. 1) may identify whether the first value is equal to or lower than a predetermined threshold value corresponding to connection of an external electronic device to a first interface. The connection of the external electronic device to the first interface, described with reference to FIG. 10, may correspond to the start of operation of the first module, described with reference to FIG. 2 to FIG. 9. For example, the operation of identifying whether the first value is equal to or lower than the predetermined threshold value corresponding to the connection of the external electronic device to the first interface in operation 1003 may correspond to the operation of identifying whether the first value is equal to or lower than the predetermined threshold value corresponding to the operation of the first module in operation 603 in FIG. 6. For example, the electronic device 101 may identify whether the first value is equal to or lower than a threshold value corresponding to connection of a USB device to the USB interface 340.

In operation 1005, according to various embodiments, in response to identification of the first value being equal to or lower than the predetermined threshold value corresponding to the connection of the external electronic device to the first interface, the electronic device 101 (e.g., the processor 120 in FIG. 1) may identify the connection of an external electronic device to the first interface adjacently disposed around the first antenna element. The first antenna element may be one of the first antenna 310 or the second antenna 320, and the first interface may include interfaces adjacently disposed around the first antenna 310 or the second antenna 320. The operation of identifying the connection of the external electronic device to the first interface adjacently disposed around the first antenna element in operation 1005 may correspond to the operation of identifying whether the operation of the first module adjacently disposed around the first antenna element is started, in operation 603 in FIG. 6. For example, in response to identification of the first value being equal to or lower than a threshold value corresponding to connection of a USB device to the USB interface 340, the electronic device 101 may identify the connection of a USB device to the USB interface 340 adjacently disposed around the second antenna 320.

The electronic device 101 (e.g., the processor 120 in FIG. 1) according to various embodiments may identify a first value including a noise value generated by the connection of the external electronic device to the first interface. For example, referring to FIG. 11, the electronic device 101 may identify a first value 1110 for each frequency band (band 1 (B1), band 3 (B3), and band 7 (B7)) through the second antenna 320 before the connection of the external electronic device to the USB interface 340. If the USB device is connected to the USB interface 340 in the normal direction, the electronic device 101 may identify first values 1120a, 1120b, and 1120c for respective frequency bands (band 1 (B1), band 3 (B3), and band 7 (B7)) through the second antenna 320, and the first values 1120a, 1120b, and 1120c include noise values 1140a, 1140b, and 1140c corresponding to connection to the USB interface 340 in the normal direction. If the USB device is connected to the USB interface 340 in the reverse direction, the electronic device 101 may identify first values 1130a, 1130b, and 1130c for frequency bands (band 1 (B1), band 3 (B3), and band 7 (B7)) through the second antenna 320, and the first values 1130a, 1130b, and 1130c include noise values 1150a, 1150b, and 1150c corresponding to connection to the USB interface 340 in the reverse direction.

The electronic device may compare the first value 1110 before the connection of the USB device with the first values 1120a, 1120b, and 1120c after the connection of the USB device in the normal direction, to identify that the noise values 1140a and 1140c corresponding to the connection to the USB interface 340 within respective frequency bands (band 1 (B1), band 3 (B3), and band 7 (B7)) are generated within band 3 (B3) and band 7 (B7).

In operation 1007, according to various embodiments, in response to identification of the connection of the external electronic device to the first interface, the electronic device 101 (e.g., the processor 120 in FIG. 1) may compensate for a first value after the connection to the first interface is identified, by using a first value before the connection to the first interface is identified, or a second value after the connection to the first interface is identified. The operation of compensating for the first value after the connection to the first interface is identified, in operation 1007 may correspond to the operation of compensating for the first value after the operation of the first module is started, in operation 205 in FIG. 2. For example, in response to the identification of the connection of the external electronic device to the first interface, the electronic device 101 may replace a first value after the connection to the first interface is identified, with a first value before the connection to the first interface is identified, so as to calculate a compensated first value. As another example, in response to the identification of the connection to the first interface, the electronic device 101 may replace a first value after the connection to the first interface is identified, with a second value after the connection to the first interface is identified, so as to calculate a compensated first value. As another example, in response to the identification of the connection to the first interface, the electronic device 101 may apply a predetermined difference value corresponding to the connection of the external electronic device to the first interface, to a second value after the connection to the first interface is identified, so as to calculate a compensated first value.

In operation 1009, according to various embodiments, the electronic device 101 (e.g., the processor 120 in FIG. 1) may perform operation of the communication circuit by using the compensated first value. Operation 1009 is an operation corresponding to operation 207 in FIG. 2, and the electronic device 101 may perform operation 1009 by using operation 207 in FIG. 2. The electronic device 101 (e.g., the processor 120 in FIG. 1) according to various embodiments may finish compensating for the first value in response to disconnection of the external electronic device from the first interface.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include: a communication circuit including a first antenna element and a second antenna element, and configured to identify a first value through the first antenna element and identify a second value through the second antenna element; a processor; and at least one memory, wherein the at least one memory may store instructions configured to, when executed, cause the processor to: identify whether operation of a first module adjacently disposed around the first antenna element has been started; in response to identification of a start of operation of the first module, compensate for the first value after the operation of the first module is started, by using the first value before the operation of the first module is started, or the second value after the operation of the first module is started; and perform operation of the communication circuit by using the compensated first value, and wherein the first value after the operation of the first module is started may include a first noise value generated by the operation of the first module.

According to various embodiments, the first antenna element may be one of a first antenna positioned at an upper end of the electronic device, or a second antenna positioned at a lower end of the electronic device, and the second antenna element may a remaining one of the first antenna or the second antenna.

According to various embodiments, the first module may include at least one of a camera module, an LCD module, a speaker module, a microphone module, an LED module, a sensor module, a USB interface, and an earphone jack interface.

According to various embodiments, the first value or the second value may be of a received signal strength indicator (RSSI) type or a reference signal received power (RSRP) type.

According to various embodiments, the instructions may be configured to cause the processor to: identify whether the first value is equal to or lower than a predetermined threshold value corresponding to the operation of the first module; and in response to the first value being equal to or lower than the predetermined threshold value, identify whether the operation of the first module has been started.

According to various embodiments, the instructions may be configured to cause the processor to, in response to the identification of the start of the operation of the first module, replace the first value after the operation of the first module is started, with the first value before the operation of the first module is started, so as to calculate the compensated first value.

According to various embodiments, the instructions may be configured to cause the processor to, in response to the identification of the start of the operation of the first module, replace the first value after the operation of the first module is started, with the second value after the operation of the first module is started, so as to calculate the compensated first value.

According to various embodiments, the instructions may be configured to cause the processor to, in response to the identification of the start of the operation of the first module, apply a predetermined difference value corresponding to the operation of the first module to the second value after the operation of the first module is started, so as to calculate the compensated first value.

According to various embodiments, the instructions may be configured to cause the processor to compensate for the first value by using a pre-stored lookup table including at least one predetermined difference value corresponding to operation of at least one module at at least one frequency.

According to various embodiments, the instructions may be configured to cause the processor to, when a communication with another electronic device is performed by using the second antenna element, apply a preconfigured first value corresponding to operation of the second antenna element so as to compensate for the first value.

According to various embodiments, the instructions may be configured to cause the processor to: identify a part of the electronic device, which is gripped by a user, during the operation of the first module; in response to identifying that the gripped part corresponds to a part in which the first antenna element is positioned, additionally apply a preconfigured second value to the compensated first value so as to calculate an additionally compensated first value; and in response to identifying that the gripped part corresponds to a part in which the second antenna element is positioned, apply the preconfigured second value to the second value so as to calculate a compensated second value.

According to various embodiments, the instructions may be configured to cause the processor to: in response to identifying that operation of a second module adjacently disposed around the second antenna element has been started during the operation of the first module, compensate for the second value after the operation of the second module is started, by using the second value before the operation of the second module is started; and in response to identifying that operation of a third module adjacently disposed around the first antenna element has been started during the operation of the first module, identify a first noise value generated by the operation of the first module and a second noise value generated by the operation of the third module, and compensate for the first value, based on a result of the identifying.

According to various embodiments, the instructions may be configured to cause the processor to, in response to identification of an end of the operation of the first module, finish compensating for the first value.

According to various embodiments, an electronic device may include: a communication circuit including a first antenna element and a second antenna element, and configured to identify a first value through the first antenna element and identify a second value through the second antenna element; a processor; and at least one memory, wherein the at least one memory may store instructions configured to, when executed, cause the processor to: identify connection of an external electronic device to a first interface adjacently disposed around the first antenna element; in response to identification of connection of the external electronic device to the first interface, compensate for the first value after the connection to the first interface is identified, by using the first value before the connection to the first interface is identified, or the second value after the connection to the first interface is identified; and perform operation of the communication circuit by using the compensated first value, and wherein the first value after the external electronic device is connected may include a noise value generated by the connection of the external electronic device.

According to various embodiments, the instructions may be configured to cause the processor to: identify whether the first value is equal to or lower than a predetermined threshold value corresponding to the connection to the first interface; and in response to the first value being equal to or lower than the predetermined threshold value, identify whether the connection to the first interface has been identified.

According to various embodiments, the instructions may be configured to cause the processor to, in response to the identification of the connection to the first interface, replace the first value after the connection to the first interface is identified, with the first value before the connection to the first interface is identified, so as to calculate the compensated first value.

According to various embodiments, the instructions may be configured to cause the processor to, in response to the identification of the connection to the first interface, replace the first value after the connection to the first interface is identified, with the second value after the connection to the first interface is identified, so as to calculate the compensated first value.

According to various embodiments, the instructions may be configured to cause the processor to, in response to the identification of the connection to the first interface, apply a predetermined difference value corresponding to the connection to the first interface to the second value after the connection to the first interface is identified, so as to calculate the compensated first value.

According to various embodiments, a method for compensating for a value measured by an antenna may include: identifying a first value through a first antenna element and identifying a second value through a second antenna element; identifying whether operation of a first module adjacently disposed around the first antenna element has been started; in response to identification of a start of operation of the first module, compensating for the first value after the operation of the first module is started, by using the first value before the operation of the first module is started, or the second value after the operation of the first module is started; and performing operation of a communication circuit by using the compensated first value, wherein the first value after the operation of the first module is started includes a first noise value generated by the operation of the first module.

According to various embodiments, a method for compensating for a value measured by an antenna may include: identifying a first value through a first antenna element and identifying a second value through a second antenna element; identifying connection of an external electronic device to a first interface adjacently disposed around the first antenna element; in response to identification of connection of the external electronic device to the first interface, compensating for the first value after the connection to the first interface is identified, by using the first value before the connection to the first interface is identified, or the second value after the connection to the first interface is identified; and performing operation of a communication circuit by using the compensated first value, wherein the first value after the external electronic device is connected includes a noise value generated by the connection of the external electronic device.

The invention claimed is:

1. An electronic device comprising:
a communication circuit including a first antenna element and a second antenna element, and configured to identify a first value through the first antenna element and identify a second value through the second antenna element, wherein the first antenna element is spaced apart from the second antenna element;
a processor; and
at least one memory,
wherein the at least one memory stores instructions configured to, when executed, cause the processor to:
identify whether the first value is equal to or lower than a predetermined threshold value corresponding to operation of a first module;
in response to the first value being equal to or lower than the predetermined threshold value, identify whether the operation of the first module adjacently disposed around the first antenna element has been started;
in response to identification of a start of operation of the first module, compensate for the first value after the operation of the first module is started, by using the first value before the operation of the first module is started, or the second value after the operation of the first module is started; and
perform operation of the communication circuit by using the compensated first value, and
wherein the first value after the operation of the first module is started includes a first noise value generated by the operation of the first module.

2. The electronic device of claim 1, wherein the first antenna element is one of a first antenna positioned at an upper end of the electronic device, or a second antenna positioned at a lower end of the electronic device, and
wherein the second antenna element is a remaining one of the first antenna or the second antenna.

3. The electronic device of claim 1, wherein the first module includes at least one of a camera module, an LCD module, a speaker module, a microphone module, an LED module, a sensor module, a USB interface, and an earphone jack interface.

4. The electronic device of claim 1, wherein the first value or the second value is of a received signal strength indicator (RSSI) type or a reference signal received power (RSRP) type.

5. The electronic device of claim 1, wherein the instructions are configured to cause the processor to, in response to the identification of the start of the operation of the first module, replace the first value after the operation of the first module is started, with the first value before the operation of the first module is started, so as to calculate the compensated first value.

6. The electronic device of claim 1, wherein the instructions are configured to cause the processor to, in response to the identification of the start of the operation of the first module, replace the first value after the operation of the first module is started, with the second value after the operation of the first module is started, so as to calculate the compensated first value.

7. The electronic device of claim 1, wherein the instructions are configured to cause the processor to, in response to the identification of the start of the operation of the first module, apply a predetermined difference value corresponding to the operation of the first module to the second value after the operation of the first module is started, so as to calculate the compensated first value.

8. The electronic device of claim 7, wherein the instructions are configured to cause the processor to, compensate for the first value by using a pre-stored lookup table including at least one predetermined difference value corresponding to operation of at least one module at at least one frequency.

9. The electronic device of claim 1, wherein the instructions are configured to cause the processor to, when a communication with another electronic device is performed by using the second antenna element, apply a preconfigured first value corresponding to operation of the second antenna element so as to compensate for the first value.

10. The electronic device of claim 1, wherein the instructions are configured to cause the processor to:
identify a part of the electronic device, which is gripped by a user, during the operation of the first module;
in response to identifying that the gripped part corresponds to a part in which the first antenna element is positioned, additionally apply a preconfigured second value to the compensated first value so as to calculate an additionally compensated first value; and
in response to identifying that the gripped part corresponds to a part in which the second antenna element is positioned, apply the preconfigured second value to the second value so as to calculate a compensated second value.

11. The electronic device of claim 1, wherein the instructions are configured to cause the processor to:
in response to identifying that operation of a second module adjacently disposed around the second antenna element has been started during the operation of the first module, compensate for the second value after the operation of the second module is started, by using the second value before the operation of the second module is started; and
in response to identifying that operation of a third module adjacently disposed around the first antenna element has been started during the operation of the first module, identify a first noise value generated by the operation of the first module and a second noise value generated by the operation of the third module, and compensate for the first value, based on a result of the identifying.

12. The electronic device of claim 1, wherein the instructions are configured to cause the processor to, in response to identification of an end of the operation of the first module, finish compensating for the first value.

13. An electronic device comprising:
a communication circuit including a first antenna element and a second antenna element, and configured to identify a first value through the first antenna element and identify a second value through the second antenna element, wherein the first antenna element is spaced apart from the second antenna element;
a processor; and
at least one memory,
wherein the at least one memory stores instructions configured to, when executed, cause the processor to:
identify whether the first value is equal to or lower than a predetermined threshold value corresponding to a connection to a first interface; and
in response to the first value being equal to or lower than the predetermined threshold value, identify whether connection of an external electronic device to a first interface adjacently disposed around the first antenna element;
in response to identification of connection of the external electronic device to the first interface, compensate for the first value after the connection to the first interface is identified, by using the first value before the connection to the first interface is identified, or the second value after the connection to the first interface is identified; and
perform operation of the communication circuit by using the compensated first value, and
wherein the first value after the external electronic device is connected includes a noise value generated by the connection of the external electronic device.

* * * * *